Figure 1:
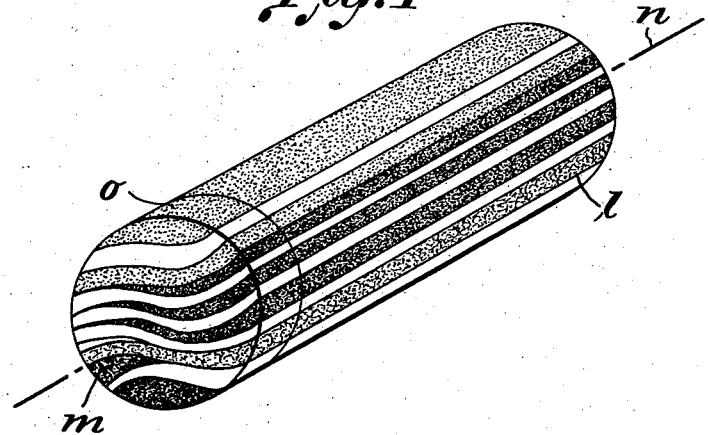

Dec. 7, 1937.  K. GULLICH  2,101,540
PROCESS FOR PRODUCING ARTICLES FROM MOLDABLE POWDER
Filed May 8, 1935

Inventor:
KURT GULLICH
By
Potter, Pierce & Schiffler
Attorneys.

Patented Dec. 7, 1937

2,101,540

UNITED STATES PATENT OFFICE 2,101,540

PROCESS FOR PRODUCING ARTICLES FROM MOLDABLE POWDER

Kurt Gullich, Marienberg in Saxony, Germany, assignor to Bisonit G. m. b. H., Marienberg in Saxony, Germany Application May 8, 1935, Serial No. 20,498 In Germany May 8, 1934

3 Claims. (Cl. 18—61)

My invention relates to an improved process for producing articles from moldable powder and molded articles made according to this process.

Articles manufactured from natural products, such as wood, ivory, and particularly of horn, are remarkable for their pleasing design, their coloration and the pattern passing right through.

It has been tried in various ways to imitate such natural products, particularly by manufacturing ornamented articles from moldable powder, such as horn flour.

A known process consists substantially in this that a design is produced on the surface of the article, such as for instance buttons. To this end perforated stencils are used through which coloring matter in a liquid or a powdery form is applied to a monocolored material, such as molded or pre-molded articles. If the pattern is applied prior to molding, the colored ornamenting material is applied, according to the desired design, through the slots of the stencil to the basic layer in the mold, thus producing a patterned layer which is then united by molding with the basic material. All such processes according to which the pattern is obtained by means of a perforated stencil, have the drawback that only a patterned layer of small thickness can be produced.

It has further been proposed to engrave the design into a printing plate, filling the cavities with colored powder and imprinting the design obtained onto the basic composition under heat and pressure. However, as will be known, especially in the case of fine lines, such designs can only be engraved at very little depth, so that also by this process the patterned layer will be only of slight thickness.

In order to obtain the impression that the pattern passes right through the article, it has been proposed to superimpose in parallel levels several similarly designed layers in the mold which are separated by non-patterned layers and to unite them under pressure. However, the articles thus manufactured are too expensive owing to the complicated operation method. Besides, the interposed layers having only one color and no design, will show at the side of the articles and it will be recognized that the article is only an imitation of a natural product.

According to my present invention these disadvantages will be obviated. According to my improved process, it is possible to produce from differently colored moldable powders patterned articles the design of which is similar to natural products, said patterned articles being of any desired dimensions. According to the present invention a composition with a genuine pattern is manufactured which can be molded in molds to articles of any desired shape. The finished article, according to this invention, shows a genuine pattern which passes through from the front to the back.

The genuine pattern is obtained, according to the present invention, in such a way that a moldable powder, such as horn flour, is filled to a given depth into a container or mold having the shape of a channel or trough. Such a loose layer of molding powder is compressed and shaped at the same time. For compressing the molding powder one uses a molding die having a correspondingly shaped surface and extending over the whole length of said layer in the channel or trough. This compression is effected without application of heat. To the shaped surface of the compressed layer a second layer of a moldable powder, preferably of a different color, is applied. This powder will then adjust itself to the profiled surface of the first layer and will then be compressed from above by a profiled molding die in order to profile the upper surface. In this way two differently colored shaped layers will be superimposed. On the profiled surface of this second layer it is possible to form in the channel or trough a third, a fourth and still further layers of different color and different cross-section. The degree of compression of the superimposed layers should preferably be essentially the same. By filling each layer in a powdery condition onto the previously shaped surface the various layers forming the natural pattern will closely fit into one another.

When applying the moldable powder to form the individual layers, several differently colored moldable powders may be poured simultaneously into the mold thereby obtaining a multi-colored layer.

It would also be within the scope of the present invention to manufacture each individual compressed layer in a separate mold and then to unite in a mold the individual sections. Care must be taken that the individual sections will fit exactly into one another.

The cross-section of each individual layer corresponds to one part of the pattern desired. Closely connected, like mosaic-work, the sections of the corresponding layers will yield the design of the pattern in question. A pattern may consist of only two or three layers, but also of a good many.

The length of the layers will correspond to the length of the channel-like mold. The latter may be of any length. Therefore it is possible to manufacture, according to the present invention, both disc-like and rod-like natural patterns, the design of which passes through the whole length of the channel-like mold.

After filling the channel-like mold with the superimposed and shaped layers of moldable powder, it is advantageous to loosen the coherence of the individual layers which have been compressed previously. For this purpose the mold may be closed and then placed on a shaking plate. The vibration of the mold will be communicated to the layers contained therein, slackening the coherence obtained by compression. However, it is also possible to attain this result by employing other expedients.

A pre-molded article is then manufactured by pressing a mold cover onto the mold under application of heat, said mold cover corresponding in its shape and dimensions to the mold. The resulting pre-molded article is portable and may be divided into several parts for instance by cutting and it can be molded by simultaneous action of heat and pressure in a known manner to the final desired article. The finished article will look exactly like an article made of a natural product and it may be worked in a similar manner.

The patterned material manufactured according to this invention can be employed in many ways. For instance, it is possible to apply to the surface of a uniform moldable powder a patterned pre-molded material and to mold the product obtained under heat and pressure, thereby producing an article which will show a genuine pattern on one side only. Furthermore the patterned articles made according to this invention may be used in the same manner as natural products, such as natural horn, for the decoration of other materials, for example for the decoration of handles of walking sticks or umbrellas.

Figure 2:
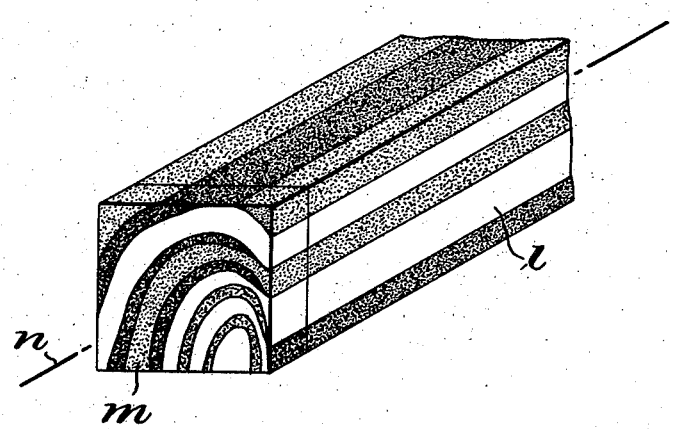

Figures 1 and 2 represent by way of example pre-molded articles made in accordance with the present invention, the pattern $m$ of which passes in the longitudinal direction $n$ through from one cut surface of body $l$ to its other cut surface. The body according to Fig. 1 has a circular cross-section and that according to Fig. 2 is of a square shape. The channels or troughs used for the production of such bodies are accordingly of a circular or square section. These pre-molded articles may be severed into individual parts, for example discs $o$, which are then molded in necessary molds to finished products, such as buttons, under simultaneous application of heat and pressure. Such products show a pattern passing through from front to back.

My invention is not limited to the steps described above by way of example, nor to the materials above mentioned. In carrying out my invention any suitable apparatus may be used in which it is possible to produce from differently colored moldable powders superimposed, profiled layers by compression and to unite such layers to pre-molded articles. According to my invention any moldable powder may be used which by compressing will yield pre-molded materials and by hot-molding finished molded articles. Generally the various individual layers will preferably be made from a moldable powder of the same composition. However, without deviating from the scope of my invention, the different powders may also be made of different composition, provided that such moldable powders will combine to a homogeneous product in the course of the treatment described above.

What I claim is:

1. Process for manufacturing pre-molded articles patterned right through in various colors, from a powder of a product which is moldable under heat, such as horn flour, which comprises only partially filling a mold cavity with a quantity of the moldable powder to form a continuous layer of the same on the bottom of the mold; shaping the upper surface of, and compressing, the layer, unheated, by means of a profiled die; applying to the resulting profiled surface of the compressed partial filling of powder another layer of the moldable powder having a different color than the first partial filling; shaping the upper surface of, and compressing, the second layer, unheated, by means of a profiled die, to produce a second compressed layer having a different color and a different cross-section than the previous layer; introducing in the same manner at least one other layer of the moldable distinctively colored powder; and finally uniting the so-placed portions of moldable powders by the simultaneous application of pressure and moderate heat whereby to form a pre-molded coherent shaped article.

2. Process for manufacturing pre-molded articles as defined in claim 1, in which the compressed filling, prior to being pre-molded, is subjected to a shaking operation whereby the coherence between the individual compressed layers is lessened.

3. Process for manufacturing molded articles patterned right through in various colors, from a powder of a product which is moldable under heat, such as horn flour, which comprises only partially filling a mold cavity with a quantity of the moldable powder to form a continuous layer of the same on the bottom of the mold; shaping the upper surface of, and compressing, the layer, unheated, by means of a profiled die; applying to the resulting profiled surface of the compressed partial filling of powder another layer of the moldable powder having a different color than the first partial filling; shaping the upper surface of, and compressing, the second layer, unheated, by means of a profiled die, to produce a second layer having a different color and different cross-section than the previous layer; introducing in the same manner at least one other layer of the moldable distinctively colored powder; and finally uniting the so-placed portions of moldable powders by the simultaneous application of pressure and moderate heat whereby to form a pre-molded coherent shaped article; severing a section from the pre-molded article; and thereafter finish molding said section by the simultaneous applicaton thereto of pressure and heat.

KURT GULLICH.